United States Patent [19]

Nishimura

[11] Patent Number: 4,860,867

[45] Date of Patent: Aug. 29, 1989

[54] ELECTROMAGNETIC CLUTCH

[75] Inventor: Kazuo Nishimura, Isesaki, Japan

[73] Assignee: Sanden Corporation, Gunma, Japan

[21] Appl. No.: 67,879

[22] Filed: Jun. 30, 1987

[30] Foreign Application Priority Data

Jul. 14, 1986 [JP] Japan ................................ 61-163687

[51] Int. Cl.[4] .......................... F16D 27/10; F16D 3/68
[52] U.S. Cl. .............................. 192/84 C; 192/106.1; 464/94
[58] Field of Search ............... 192/84 C, 106.1, 30 V; 464/73, 92, 94, 95

[56] References Cited

U.S. PATENT DOCUMENTS

| | | | |
|---|---|---|---|
| 1,964,054 | 6/1934 | Harris | 192/106.1 |
| 1,984,578 | 12/1934 | Griswold | 192/106.1 X |
| 2,105,702 | 1/1938 | Scholtze | 464/73 |
| 3,082,933 | 3/1963 | Bernard | 417/319 |
| 3,384,213 | 5/1968 | Bernard et al. | 192/84 C |
| 3,396,556 | 8/1968 | Giegerich | 464/73 |
| 3,425,529 | 2/1969 | Hayashi | 192/84 R |
| 3,455,421 | 7/1969 | Miller | 192/84 C |
| 3,565,223 | 2/1971 | Pierce | 192/84 C |
| 4,150,738 | 4/1979 | Sayo et al. | 192/84 C |
| 4,172,369 | 10/1979 | Hayes et al. | 464/73 |
| 4,187,939 | 2/1980 | Silvestrini et al. | 192/84 C |
| 4,296,851 | 10/1981 | Pierce | 192/84 C |
| 4,425,520 | 1/1984 | Hiraga | 310/92 |
| 4,445,606 | 5/1984 | Van Laningham | 192/106.1 |
| 4,493,407 | 1/1985 | Newton | 192/84 C |
| 4,624,354 | 11/1986 | Koitabashi | 192/84 C |
| 4,694,945 | 9/1987 | Koitabashi | 192/84 C |
| 4,718,526 | 1/1988 | Koitabashi | 192/84 C X |
| 4,757,888 | 7/1988 | Nakajima | 192/84 C |

FOREIGN PATENT DOCUMENTS

| | | |
|---|---|---|
| 0175016 | 3/1986 | European Pat. Off. . |
| 20908 | 2/1980 | Japan ................... 192/84 C |
| 57-39639 | 9/1982 | Japan . |
| 642694 | 9/1950 | United Kingdom ................... 464/73 |
| 1180697 | 2/1970 | United Kingdom . |
| 1235699 | 6/1971 | United Kingdom . |
| 2024368 | 1/1980 | United Kingdom . |
| 1589088 | 5/1981 | United Kingdom . |

Primary Examiner—Dwight G. Diehl
Assistant Examiner—Richard M. Lorence
Attorney, Agent, or Firm—Banner, Birch, McKie & Beckett

[57] ABSTRACT

An electromagnetic clutch for an automotive air conditioning system is disclosed which includes a rotor, an electromagnetic coil, and an armature plate. A boss is secured to a drive shaft and has a wave-shaped flange which is formed on the outer surface of the boss. A front plate is disposed forwardly of the wave-shaped flange of the boss through a ring-shaped washer of elastic material. A rear plate is disposed rearwardly of the wave-shaped flange of the boss through another ring-shaped washer of elastic material. The armature plate is connected to the boss, which connects the front plate and rear plate through the washers made of elastic material, respectively, through a plurality of leaf springs. When the above electromagnetic clutch is supplied with electric current, the rotational force in the direction opposite to the rotational force of the front plate and rear plate is added to the boss. However, since the front plate and rear plate are rotatably fixed to the boss through the ring-shaped washers made of elastic material, the drive shaft is prevented from receiving torsional resonance by the compression and deformation of the ring-shaped washers.

12 Claims, 2 Drawing Sheets

ELECTROMAGNETIC CLUTCH

TECHNICAL FIELD

This invention relates to an electromagnetic clutch, such as one used in controlling the transmission of power from an automotive engine to a refrigerant compressor for an automotive air conditioning system and more particularly, to an improved engaging structure between an armature and a hub for transferring the rotation of a pulley to the drive shaft of a driven device.

BACKGROUND OF THE INVENTION

Various types of electromagnetic clutches are well known in the prior art and each type of electromagnetic clutch is selected in accordance with the type of driven device.

One of the electromagnetic clutches suitable for use with the compressor of an automobile air conditioner is disclosed in U.S. Pat. No. 4,445,606. That patent discloses an electromagnetic clutch comprising a rotor rotatably mounted on the stationary housing of a driven device through a bearing, a hub fixed on the axial end surface of the drive shaft and an armature disposed such that it is facing one end surface of the rotor with an axial gap therebetween.

A bumper plate is disposed on the outer peripheral portion of the hub to couple it with the hub by means of a toothed structure. An elastic spider is placed between the hub and bumper plate to allow limited rotation of the hub. The bumper plate also faces the armature plate with a gap therebetween, and engages the armature plate through a plurality of leaf springs. Therefore, torsional shock and vibration which is caused by initial attachment of the armature plate to the pole face of the rotor and which acts against the drive shaft is absorbed.

In this type of electromagnetic clutch, the elastic spider is made of an elastic material, for example, a rubber, and attached on the toothed structure of the hub and bumper plate by a vulcanizing process. However, the coupling structure between the bumper plate and the hub is very complicated. As a result, the assembly of the clutch, particularly, the vulcanizing process is a complicated operation. Thus, the cost of the clutch is increased.

SUMMARY OF THE INVENTION

It is a primary object of this invention to provide an electromagnetic clutch which has a mechanism, which is simply constructed, for easing the tortional resonance, shock, and vibration transmitted to a drive shaft.

It is another object of this invention to provide an electromagnetic clutch in which the parts are easily manufactured.

It is still another object of this invention to provide an electromagnetic clutch in which the assembly is accomplished by a simple process.

An electromagnetic clutch, according to this invention, includes a first rotatable member having an axial end plate of magnetic material and a second rotatable member which is to be connected to a driven member. An annular armature plate made of a magnetic material is disposed forwardly of the first rotatable member so as to be capable of limited axial movement and so that it faces the axial end plate of the first rotatable member with an axial gap therebetween. An electromagnetic means is associated with the axial end plate for attracting the armature plate thereto. A wave-shaped flange is formed on the outer surface of the second rotatable member. A front plate is disposed forwardly of the wave-shaped flange through a washer made of elastic material and a rear plate is disposed rearwardly of the wave-shaped flange through another washer of elastic material. Therefore, torsional resonance, shock, and vibration are eased by the principally compressive deformation of the washers, made of elastic material, which are disposed between the front plate and the wave-shaped flange and between the rear plate and the wave-shaped flange, respectively.

Further objects, features and aspects of this invention will be understood from the following detailed description of the preferred embodiments of this invention with reference to the annexed drawings.

DETAILED DESCRIPTION OF THE PREFERRED EMBODIMENTS

Figure 1:
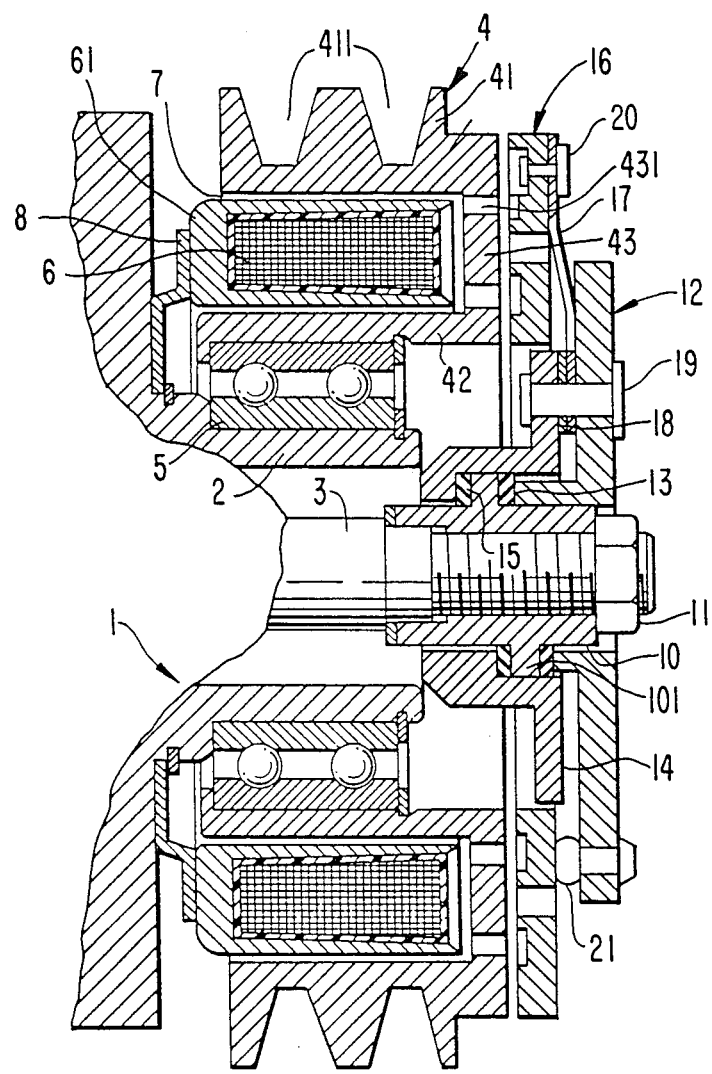
FIG. 1 is a cross-sectional view of an electromagnetic clutch in accordance with one embodiment of this invention.

Referring to FIG. 1, there is shown an electromagnetic clutch which, according to one embodiment of this invention, is assembled to a refrigerant compressor for an automotive air conditioning system. Compressor housing indicated generally as 1 is provided with tubular extension 2 projecting therefrom for surrounding a drive shaft 3. Drive shaft 3 is rotatably supported in compressor housing 1 by a bearing (not shown).

Rotor 4 is rotatably supported on tubular extension 2 through bearing 5 which is mounted on the outer peripheral surface of tubular extension 2. Rotor 4 is made of magnetic material, such as steel, and comprises outer cylindrical portion 41, inner cylindrical portion 42 and axial end plate portion 43 which connects outer and inner portions 41, 42 at an axial forward end. Outer cylindrical portion 41 has formed therein pulley portion 411 for receiving a belt for coupling the compressor to the output shaft of the automotive engine (not shown).

Axial end plate portion 43 includes one or more concentric slits 431 which are disposed on one or more concentric circles. These slits 431 define a plurality of annular or arcuate magnetic pieces with the surface of the poles being on the axial end surface of axial end plate portion 431.

Electromagnetic coil 6 is disposed in annular cavity 7 of rotor 4. Coil 6 is contained within annular magnetic housing 61 having a U-shaped cross-section. Housing 61 is fixed to supporting plate 6, which is secured to the axial end surface of compressor housing 1 by a plurality of rivets (not shown). Coil housing 61 is maintained within cavity 7 out of contact with rotor 4 with a small gap between them for permitting rotation of rotor 4.

Figure 2:
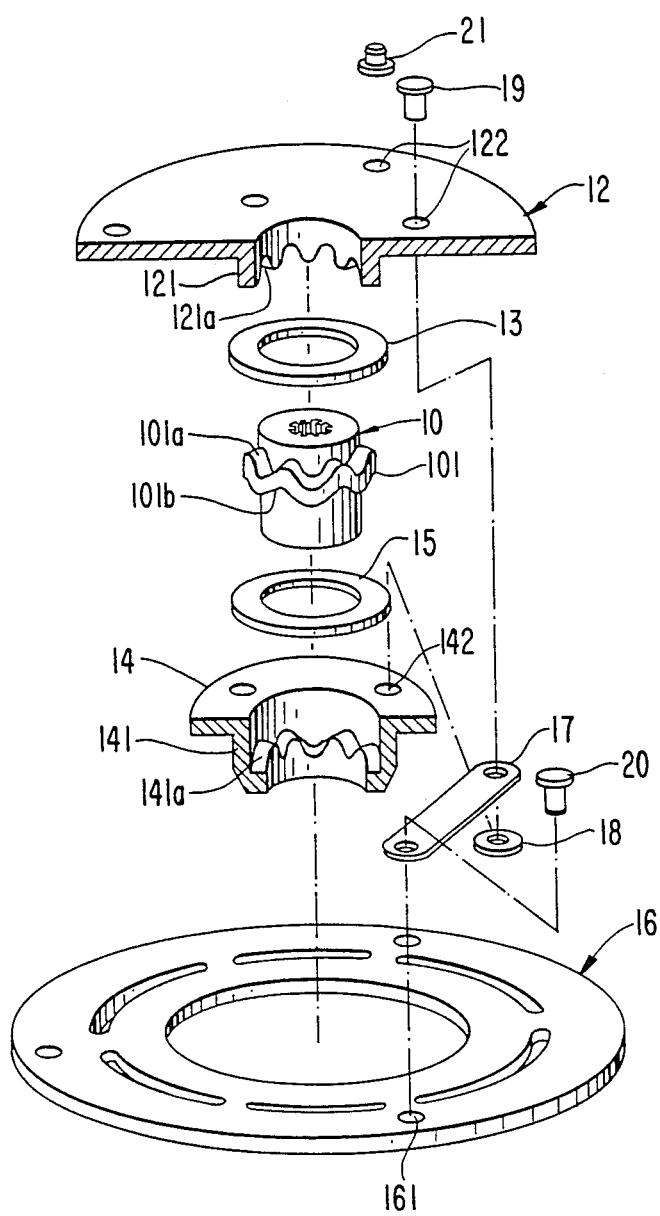
FIG. 2 is a partial perspective view of the electromagnetic clutch of FIG. 1.

With reference to FIG. 2, the main construction of an electromagnetic clutch according to this invention is shown. Boss 10 is disposed on an outer terminal end of drive shaft 3 and is secured to drive shaft 3 by nut 11. Boss 10 is provided with wave-shaped flange 101 which annularly extends from the outer peripheral surface thereof to have wave-shaped surfaces 101a, 101b on both sides, that is to say, the wave-shaped flange 101 is a double-sided wave-shaped flange.

Front end plate 12 is disposed on the axial forward end of boss 10 through ring-shaped washer 13 which is made of elastic material, such as rubber. Front plate 12 is provided with axially extending flange 121 which is formed on a wave-shaped surface 121a at its axial end which corresponds to wave-shaped surface 101a of wave-shaped flange 101.

Rear plate 14 is disposed on the axial rear end of boss 10 through ring-shaped washer 15 which is made of elastic material, such as rubber. Rear plate 14 is provided with axially extending flange 141 which includes wave-shaped portion 141a formed on the inner surface of axially extending flange 141. The axially outer surface of wave-shaped portion 141a is formed so as to correspond to wave-shaped surface 101b of wave-shaped flange 101.

A plurality of rivets 19 are inserted into holes 142 formed through rear plate 14, respectively, through holes 122 formed through front plate 12 and are fixed to one end portion of leaf springs 17. Thus, front plate 12 is fixed to rear plate 14 through one end of a plurality of leaf springs 17 and metal washers 18 by rivets 19. Armature plate 16 is provided with a plurality of holes 161, and a plurality of rivets 20 are inserted into holes 161, respectively, through the other end portion of leaf spring 17. The other end of leaf spring 17 is thus fixed to one end surface of armature plate 16 by rivets 20. Rubber stopper 21 is disposed between front plate 12 and rear plate 14 for obtaining the pre-loading force of leaf spring 17. Therefore, the rotational force of rotor 4 transmitted to armature plate 16 is transmitted to drive shaft 3 through a plurality of leaf springs 17, front plate 12 and rear plate 14.

In operation, when coil 6 is energized, armature plate 16 is attracted to axial end plate portion 43 of rotor 4 by the magnetic force of coil 6. Accordingly, the rotational force of rotor 4 is transmitted to drive shaft 3 through armature plate 16. Thus, the refrigerant compressor starts the operation of compression.

Simultaneously, compressed refrigerant gas in the refrigerant compressor produces a reaction force in the direction opposite to the rotational force of drive shaft 3. In other words, the rotational force in the direction opposite to the rotational direction of front plate 12 and rear plate 14 are rotatably fixed to boss 10 through ring-shaped washers 13, 15 made of elastic material, drive shaft 3 is prevented from receiving torsional resonance by the compression and deformation of ring-shaped washer 13, 15 made of elastic material.

This invention has been described in detail in connection with the preferred embodiments, but these are examples only and this invention is not restricted thereto. It will be easily understood by those skilled in the art that other variations and modifications can be easily made within the scope of this invention.

What is claimed is:

1. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising:

a boss element forming at least a part of said second rotatable member, said boss element comprising a double sided wave-shaped portion, plate means coupled to said armature plate and having wave-shaped portions for interfacing with said wave-shaped portion of said boss element, and an elastic element mounted between said wave-shaped portions of said boss element and said plate means to absorb torsional and vibrational forces upon actuation of said electromagnetic clutch, wherein said plate means further comprises a pair of axially extending flanges on which said wave-shaped portions are mounted.

2. The electromagnetic clutch of claim 1 wherein said wave-shaped portions of said boss element and said plate means are annular, and said elastic element is a ring-shaped element mounted between the interfacing annular wave-shaped portions of said boss element and said plate means.

3. The electromagnetic clutch of claim 2 wherein said boss element comprises an annular flange with each of said doubled sided wave-shaped portions being annular in shape and formed on opposite sides of said annular flange.

4. The electromagnetic clutch of claim 1 wherein said wave-shaped portion of said boss element has a double sided wave-shaped portion and said plate means has two wave-shaped portions, one of which interfaces each wave-shaped surface of said double sided wave shaped portion of said boss element, said electromagnetic clutch further comprising an elastic element mounted between each pair of interfacing wave-shaped portions of said boss element and said plate means to absorb torsional and vibrational forces upon actuation of said electromagnetic clutch.

5. The electromagnetic clutch of claim 4 wherein said wave-shaped portions are annular and said elastic elements are ring-shaped elements.

6. The electromagnetic clutch of claim 4 wherein said wave-shaped portions of said double sided wave-shaped portion of said boss element are mounted between and interfacing said wave-shaped portions of said plate means.

7. The electromagnetic clutch of claim 1 wherein said plate means is coupled to said armature plate by a plurality of leaf springs.

8. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising:

a boss element forming at least a part of said second rotatable member, said boss element having at least one wave-shaped portion, plate means coupled to said armature plate and having a wave-shaped portion for interfacing with said wave-shaped portion of said boss element, and an elastic element mounted between said wave-shaped portions of said boss element and said plate means to absorb torsional and vibrational forces upon actuation of said electromagnetic clutch, wherein said elastic element comprises a pre-formed elastic element and said plate means comprises a pair of axially extending flanges on which said wave-shaped portion is formed.

9. The electromagnetic clutch of claim 6 wherein said at least one wave-shaped portion of said boss element comprises wave-shaped portions that extend in a direction substantially parallel to the longitudinal axis of said boss element.

10. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and an electromagnetic means associated with said axial end plate for attracting said armature plate to said axial end plate of said first rotatable member, the improvement comprising:

a boss element forming at least a part of said second rotatable member, said boss element having at least one wave-shaped portion, plate means coupled to said armature plate and having a wave-shaped portion for interfacing with said wave-shaped portion of said boss element and an elastic element mounted between said wave-shaped portions of said boss element and said plate means to absorb torsional and vibrational forces upon actuation of said electromagnetic clutch, wherein said wave-shaped portion of said boss element has a double-sided wave-shaped portion and said plate means has two waved-shaped portions, each of which interfaces with one wave-shaped surface of said double sided wave-shaped portion of said boss element, said electromagnetic clutch further comprising an elastic element mounted between each pair of interfacing wave-shaped portions of said boss element and said plate means to absorb torsional and vibrational forces upon actuation of said electromagnetic clutch, wherein said plate means comprises a pair of axially extending flanges on opposite sides of said double sided wave-shaped portion of said boss element, one of each of said wave-shaped portions of said plate means being mounted on each of said axially extending flange portions interfacing one of said wave-shaped portions of said double sided wave-shaped portion of said boss element.

11. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising:

said second rotatable member comprising a boss element attached to said drive shaft and having a double sided wave-shaped flange portion mounted on an outer peripheral surface thereof, a front plate having a first wave-shaped portion interfacing one side of said wave-shaped flange portion of said boss element, a first elastic element between said one side of said wave-shaped flange portion of said boss element and said first wave-shaped portion of said front plate, a rear plate having a second wave-shaped portion interfacing the other side of said wave-shaped flange portion of said boss element, a second elastic element between said other side of said wave-shaped flange portion of said boss element and said second wave-shaped portion of said rear plate, and said front and rear plates being coupled together and coupled with said armature plate through a plurality of leaf springs, wherein said front plate includes an axially extending flange including said first wave-shaped portion on an axially end surface thereof so as to interface with said one wave-shaped surface of said double sided wave-shaped flange portion of said boss element.

12. In an electromagnetic clutch including a first rotatable member having an axial end plate of magnetic material, a second rotatable member connected to a drive shaft, an annular armature plate of magnetic material disposed to face said axial end plate of said first rotatable member with an axial gap therebetween, said annular armature plate being capable of limited axial movement, and electromagnetic means associated with said axial end plate for attracting said armature plate to said axial end plate of said first rotatable member, the improvement comprising:

said second rotatable member comprising a boss element attached to said drive shaft and having a double sided wave-shaped flange portion mounted on an outer peripheral surface thereof, a front plate having a first wave-shaped portion interfacing one side of said wave-shaped flange portion of said boss element, a first elastic element between said one side of said wave-shaped flange portion of said boss element and said first wave-shaped portion of said front plate, a rear plate having a second wave-shaped portion interfacing the other side of said wave-shaped flange portion of said boss element, a second elastic element between said other side of said wave-shaped flange portion of said boss element and said second wave-shaped portion of said rear plate, and said front and rear plates being coupled together and coupled with said armature plate through a plurality of leaf springs, wherein said rear plate includes an axially extending flange including said second wave-shaped portion on an axially end surface thereof so as to interface with said other wave-shaped surface of said double-sided wave-shaped flange portion of said boss element.

* * * * *